United States Patent Office
2,925,692
Patented Feb. 23, 1960

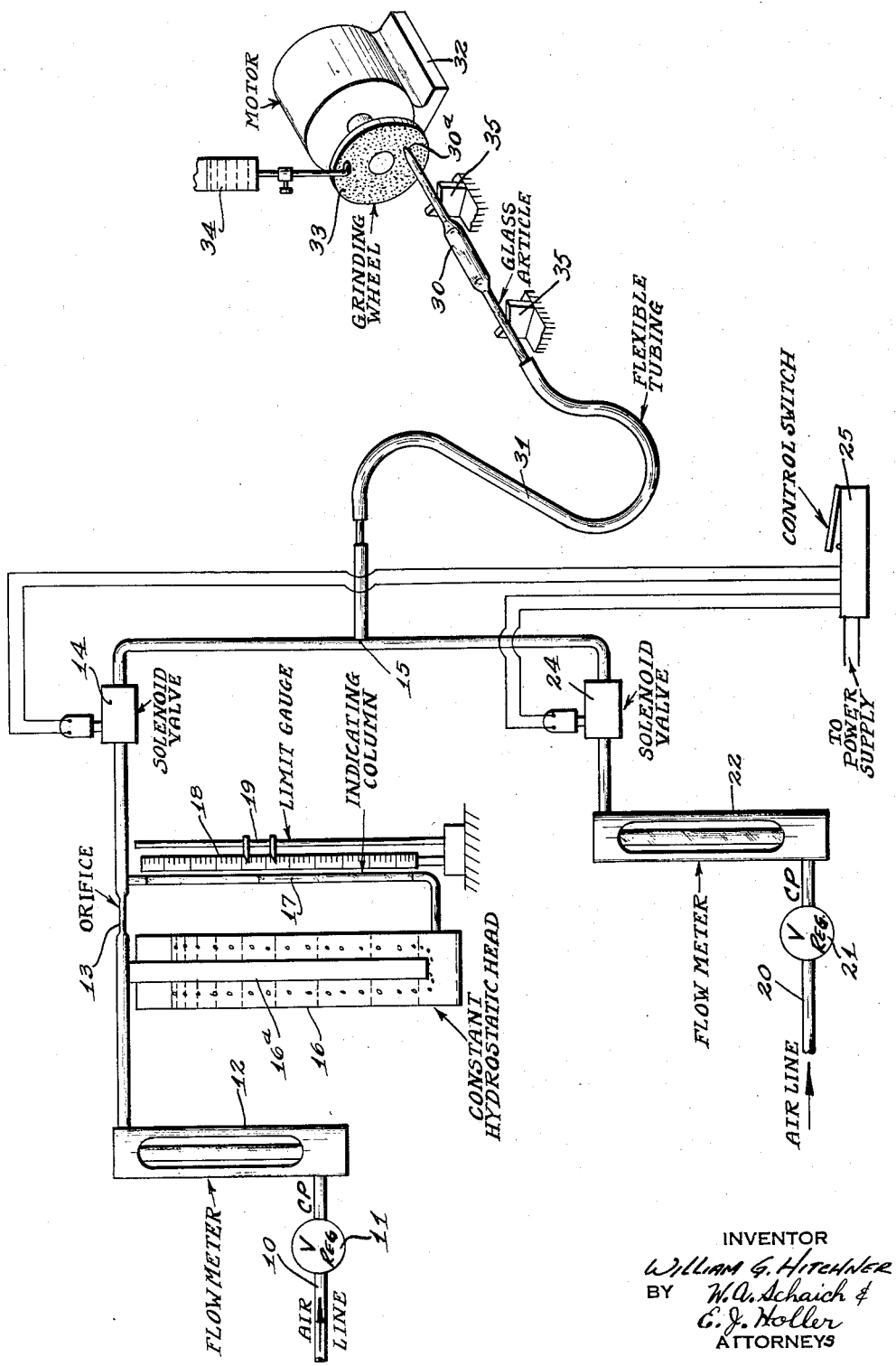

2,925,692

GAUGING APPARATUS AND METHOD OF OPERATION

William G. Hitchner, Vineland, N.J., assignor to Kimble Glass Company, a corporation of Ohio Application June 25, 1957, Serial No. 667,826

16 Claims. (Cl. 51—165)

This invention relates to gauging devices and more particularly to gauging devices in which a prescribed flow of air or other fluid takes place through the article being checked or calibrated and is applicable to measuring or comparing dimensions of the nozzle portion of the article.

A general purpose of the present invention is the provision of gauging apparatus and method of gauging utilizing fluid flow through the interior of a tubular article having a restricted nozzle portion for determining the fluid flow rate through the nozzle when the article is subsequently and repeatedly employed to deliver a prescribed amount of liquid. The invention is particularly applicable to glass articles such as volumetric pipettes which have varying internal cross-sectional areas near their tip or delivery nozzle. Each individual article of the same general design has different degrees of taper at different portions along the length of the nozzle area and slight eccentricity due to manufacturing methods. Thus, the discharge orifice of the nozzle cannot be economically precisely dimensioned to equate its cross-sectional areas to the discharge time of the glass article due to the above inherent defects.

In the manufacture of glass volumetric pipettes or other similar scientific glassware, in which liquids or solutions are temporarily retained in laboratory analyses for example, the delivery time of an individual pipette is an important factor which must be controlled in its manufacture. The delivery time may be defined as the time required for the pipette to discharge a nominal amount of distilled water with the pipette being held in a vertical position, the distilled water being allowed to flow by gravity therefrom. The factor of delivery time is important because it affects the amount of water or solution retained on the interior of the pipette upon completion of the outflow of contained liquid. In the manufacture of pipettes proper allowance must be made for the amount of distilled water which will be retained upon the wetted inner side walls of the just-emptied pipette and therefore the accuracy of an individual pipette is effected by deviation from the standard delivery time.

A volumetric pipette is a tubular glass measuring device which is carefully calibrated to measure and deliver a prescribed exact amount of liquid usually water or an aqueous solution of some chemical in actual practice. It is known that an individual pipette will deliver a larger or smaller volume of liquid deviating from its calibrated volume depending upon whether the liquid is allowed to flow from the pipette slowly or rapidly. When the outflow is slow, the liquid film retained on the wetted inner surfaces of the pipette has sufficient time to thin out, as a result of surface tension and cohesive forces within the liquid, whereby a smaller amount of liquid is retained on the pipette interior and a larger amount is delivered. Conversely, when the liquid is allowed to flow rapidly from the pipette, a larger amount is retained on the inner walls as wettage, or "liquid hold back" as it is sometimes called, and in this case a smaller total amount of liquid is delivered by the pipette.

It is vitally important that a given pipette always deliver the correct nominal volume of liquid to achieve accurate results as in its employment in chemical quantitative analyses. As a specific example, in the case of a typical 5 ml. pipette the volume of liquid delivered should be 5.00 ml. plus or minus 0.01 ml. To insure proper accuracy it is necessary to rigidly control the rate of liquid outflow by making the tip opening small. Thus, by carefully controlling the diameter of the tip opening so that all pipettes of the same size will have essentially the same opening, delivery rate and holdback will closely approach duplicatable values. It is known from the principles of hydrodynamics that the time of outflow of a fluid from a pipette tip is dependent not only on the cross-sectional area of the tip opening but also upon the contour or shape of the tapered section leading to the opening.

In present manufacturing procedures however, delivery time is controlled by dimensionally gauging the pipettes with fine steel wires constituting both a laborious and time-consuming method. In this gauging method all pipettes with tip openings above prescribed maximum and below prescribed minimum diameters are rejected. The selected pipettes which are acceptable within the given maximum-minimum limits are then timed for water delivery to ascertain whether they reside within the maximum and minimum delivery times. Pipettes which deliver their liquid volume over the maximum delivery time are individually ground at their tips and retimed. However, the amount of grinding can only be checked by the maximum-minimum wire gauges. Those which deliver their liquid volume in less than the minimum delivery time have their tips repulled (made smaller) to lengthen their delivery time. This method of grinding and plug-gauging does not compensate for out-of-roundness of the tip opening or for any variations in tip contour which affect fluid flow rates.

The method of gauging employed heretofore results in a considerable percentage of rejects which requires extensive subsequent adjustment either by grinding the tip for its enlargement or by reworking the tip in a glass working flame for its diminution. The plug-gauging operation also tends to create minute scratches on the interior of the tips which occasionally make this region highly subject to breakage.

Accordingly, an object of the present invention is the provision of gauging apparatus and method of calibrating tubular articles based upon fluid flow properties having the advantages that the article being calibrated is simultaneously ground and gauged so as to bring each individual article not only within the specified range of fluid delivery time, but with this value near the center of the specified range of delivery times, thus furnishing a more precisely fabricated article.

A still further object of this invention is to provide gauging apparatus and method of calibrating the fluid delivery time of glass volumetric pipettes by measurement and adjustment of resistance to fluid flow therethrough, whereby grinding and gauging of tip portions thereof are combined into a unitary operation thus effecting a considerable cost saving as well as an appreciable improvement in quality.

Due to various uncertainties in the above-described prior method of gauging, pipettes were formerly rechecked for delivery time at the completion of the calibrating operation. In this operation each of the pipettes is filled with water to a calibration mark while retained in a rack and the actual outflow time of the water is determined by means of a stop watch. The present invention due to its furnishment of articles having increased accuracy and reliability eliminates the necessity for the subsequent timing operation resulting in a distinct reduction in manufacturing costs.

The importance of delivery time of a given pipette can be appreciated from the fact that the U.S. Bureau of Standards requires that the delivery time be engraved on each calibrated pipette before it is acceptable by the Bureau for certification.

The specific nature of this invention, as well as other objects and advantages thereof, will become apparent to those skilled in the art from the following detailed description, taken in conjunction with the annexed sheet of drawing on which, by way of preferred example only, is illustrated the preferred embodiment of this invention.

The accompanying drawing is a diagrammatic view of the gauging apparatus illustrating the principles involved in the present invention.

The present invention will be described as applicable to the manufacture of glass volumetric pipettes, although it is to be understood that it is so described merely for purposes of explanation and not of limitation. It is fully contemplated that the apparatus and method are equally applicable to calibrating other volumetric devices where outflow time is a factor to be controlled.

The apparatus required to practice the subject invention and as shown on the drawings is described as follows:

The apparatus generally consists of two pressurized air lines which interconnect at a junction point for the supply of pressurized air at different rates to the workpiece. The two air lines which are designated by the numerals 10 and 20 constitute a measuring circuit and a purging circuit respectively for accomplishment of measuring and enlarging the tip portion of the workpiece. The illustrated workpiece comprises a glass pipette 30 whcih is to be calibrated for determination of its precise fluid delivery time by alteration of its tip opening 30a.

Air line 10 which constitutes the measuring circuit has a pressure regulating valve 11 mounted therein which delivers air at constant pressure to a flow meter 12. The air after passage through flow meter 12 travels through a capillary orifice 13 for reduction of its flow rate and then through a solenoid valve 14 and then to a connecting junction or T 15. A gas flow meter such as a glass tube having a hollow stopper with a series of four interchangeable orifices therein interconnecting the arms of a U-shaped fluid-containing tube may be utilized to provide capillary orifice 13. One form of such meter is item G-5645 shown in the 1952 catalog of Scientific Glass Apparatus Company, Bloomfield, New Jersey.

A hydrostatic head 16 is connected in parallel to air line 10 across opposite sides of orifice 13 for determination of resistance to fluid flow by measurement of back pressure of the emitting air. The hydrostatic head 16 consists of a water tank having an arm 16a of air line 10 submerged therein on the inlet or high pressure side of orifice 13. A smaller arm 17 of hydrostatic head 16 connects a bottom portion of the tank and the downstream side of orifice 13. Arm 17 comprises a water level gauge and has a relatively small internal diameter to register slight differences in line pressure in the measuring circuit beyond orifice 13. Thus, arm 17 furnishes an indicating column of liquid preferably water for reading directly the resistance to flow. Mounted adjacent to arm 17 is a calibrated scale 18 and a limit gauge 19 which may be employed to mark-off selected limits of fluid delivery time from measured known standards.

Air line 20 has a similar pressure regulating valve 21 adaptable to delivering air at constant pressure to another flow meter 22 and then through a similar solenoid valve 24 to the connecting junction or T 15. Air line 20 constitutes a purge circuit for delivering air to the pipette during alteration of its tip portion.

A control switch 25 is connected to a source of electrical power and to each of the electrically operated solenoid valves 14 and 24. Switch 25 is an on-off type arranged so that when one solenoid valve is open the other is closed and vice versa.

The interconnected air lines 10 and 20 joined at T 15 are each able to supply air to the pipette 30 through a length of flexible tubing 31 which allows free movement of the pipette. Tubing 31 may consist of a length of rubber hose having an outlet end adaptable to facilitate easy connection and disconnection of pipette 30.

A motor 32 adaptable to driving an abrasive wheel 33 is mounted adjacent the aforesaid apparatus for grinding the pipette tip opening 30a. The wheel is kept in continuous operation during use of the apparatus. An aqueous solution of grinding compound or simply water alone is supplied to the grinding wheel 33 by gravity from a small reservoir 34 mounted thereabove to improve the grinding characteristics of the glass.

Operation of the apparatus is as follows:

With control switch 25 in its normal or off position, solenoid valve 14 is closed and valve 24 is open. Thus, measuring circuit 10 is turned off and purging circuit 20 on for delivering purging air to the pipette 30 for its grinding. An increased amount of air is delivered to the pipette by the purging circuit over the measuring circuit to prevent influx of ground glass or abrasive particles into the pipette during enlargement of its tip opening 30a.

Prior to any grinding of tip opening 30a, control switch 25 is turned on reversing solenoid valves 14 and 24 from their normal positions. Thus, with switch 25 turned on, valve 24 is closed and valve 14 is open. The apparatus in this form is capable of furnishing a gauge reading on indicating column 17 to measure resistance to flow. Prior to this time, the air under constant pressure upstream of orifice 13 is adjusted to bubble air through constant hydrostatic water head 16. The flow rate through orifice 13 is governed by the size of the pipette being measured and its approximate delivery time as determined from standard articles of generally the same design.

When the resistance to air outflow through tip opening 30a is quite great due to its having an extremely small cross-sectional area, the amount of back pressure toward orifice 13 is considerable so that the difference in water level between tank and side arm is quite great. At this time the lowest water meniscus is obtained on indicating column 17. Air is allowed to flow through the pipette 30 from measuring circuit 10 for a brief interval to allow equilibrium conditions to be established before a reading is taken. If the reading falls below the lower limit of preset gauge 19, the control switch 25 is turned off, purging air is again passed through pipette and its tip 30a contacted with the grinding wheel for its enlargement. Pipette 30 may be retained in a pair of V-shaped support brackets 35 during the grinding. Depending upon how far removed the initial reading on indicating column 17 resides from the prescribed limits calibrating scale 18, tip opening 30a may be ground to a greater or lesser degree. After the tip opening is enlarged by grinding by being held normal to and continuous against wheel 33 for a short period, switch 25 is again turned on and air again passed through the pipette from measuring circuit 10 with the tip 30a separated from wheel 33 so that another reading may be taken on indicating column 17.

If the water meniscus has not been brought within the prescribed limits established on gauge 19 or into a central region therebetween, the purging air from air line 20 is again turned on and the tip reground by again contacting wheel 33 for its further enlargement. Two, three, or four such relatively brief grinding intervals may be required with fluid flow measurements taken intermittently depending upon the skill of the operator and the deviation of the particular article from standard.

The grinding is performed by holding the pipettes approximately normal to the grinding surface of wheel 33.

A relatively fine abrasive wheel is preferable for the removal of only small portions of the tip at one time. After the tip opening is enlarged to the proper degree of fluid flow, the pipette may be retained in a jig (not shown) and again contacted with the wheel at about a 45° angle to place a desirable degree of bevel thereupon. The pipette is disconnected from the calibrating apparatus and is then ready to have either its standard fluid delivery time stamped thereon or be rechecked by the old method if desired. However, the necessity of the latter is virtually eliminated.

It has been found that a relatively skilled operator can produce the calibrated pipettes at the rate of about 1 to 3 per minute which production rates are much higher than obtainable heretofore. The produced articles exhibit properties of decidedly greater uniformity of calibration with a minimum expenditure of fabrication time.

Various modifications may be resorted to within the spirit and scope of the appended claims.

I claim:

1. The method of calibrating the fluid delivery time of a tubular workpiece with a standard, said workpiece having a tapered delivery nozzle of small dimensions, said method comprising the steps of supplying fluid at a controlled rate to pass through the interior of said workpiece, allowing said fluid to freely emit from the delivery nozzle of said workpiece, measuring the resistance to flow of said fluid from said delivery nozzle during its free discharge, and enlarging said delivery nozzle by removing an exterior portion of said tapered delivery nozzle to secure a prescribed resistance to flow of said fluid therethrough.

2. The method of calibrating the fluid delivery time of a tubular workpiece with a standard in accordance with claim 1, including the step of passing air at a controlled rate through said workpiece and permitting its unrestricted emission during measurement of resistance to flow from said delivery nozzle.

3. The method of calibrating the fluid delivery time of a tubular workpiece with a standard in accordance with claim 1, including the step of enlarging said delivery nozzle located at a terminating portion of said workpiece by abrasive grinding to reduce its longitudinal dimension.

4. The method of calibrating the fluid delivery time of a tubular workpiece with a standard in accordance with claim 1, including the step of discharging purging air from said delivery nozzle during its enlargement and periodically interrupting said enlargement to measure the resistance to flow of said fluid therethrough by discharging a lesser amount of air from the unobstructed delivery nozzle.

5. The method of calibrating the fluid delivery time of a tubular glass workpiece with a standard, said workpiece having a uniformly tapered delivery nozzle, said method comprising the steps of supplying pressurized air at a controlled rate to pass through the interior of said tubular workpiece, allowing said pressurized air to freely emit from the unrestricted nozzle of said workpiece which constitutes a delivery orifice, measuring the back pressure exerted by said air due to resistance to flow from said delivery nozzle, and enlarging the delivery orifice of the tapered nozzle portion of said workpiece by reducing its longitudinal dimension and simultaneously increasing its cross-sectional opening dimension to obtain a prescribed resistance to flow of said air during its unrestricted emission from said workpiece.

6. The method of calibrating the fluid delivery time of a tubular glass workpiece in accordance with claim 5, including the step of discharging purging air at an increased rate during cross-sectional enlargement of said nozzle portion.

7. The method of calibrating the fluid delivery time of a tubular glass workpiece in accordance with claim 5, including the step of alternately measuring the resistance to flow of said pressurized air unrestricted from said delivery nozzle and enlarging the opening of the nozzle portion of said workpiece by abrasive grinding of a terminating portion thereof to decrease said resistance to flow therethrough.

8. Gauging apparatus for comparing and calibrating the fluid delivery time of a tapered delivery nozzle of a tubular workpiece with a standard comprising, in combination, at least one air line connected to the opposite end of said workpiece for delivery of pressurized air at a controlled rate to and unrestricted through said workpiece, a capillary orifice interposed within said air line, a hydrostatic head connected in parallel to said air line across opposite sides of said capillary orifice, one portion of the hydrostatic head on the side of said orifice near said workpiece adaptable to measuring the resistance to flow of said air flowing at a constant rate from the nozzle of said workpiece, and enlarging means located adjacent and normal to the axis of said workpiece for increasing the cross-sectional size of said delivery orifice to prescribed limits by external grinding.

9. Gauging apparatus for measuring and adjusting fluid flow from the tapered delivery nozzle of a tubular glass pipette comprising, in combination, a pressurized measuring gas line connected to the opposite end of said tubular pipette capable of delivering the gaseous medium at a controlled rate to said pipette, a capillary tube comprising an orifice interposed within said air line, a constant hydrostatic head of liquid interconnected in parallel across opposite sides of said capillary tube, an arm of said hydrostatic head on the side of said pipette being adaptable to measuring back pressure of the emitting gas flowing unrestrictedly from said delivery nozzle, and a flat disc grinding wheel mounted adjacent said gas line and workpiece for enlarging the tapered delivery nozzle of the latter by reducing its axial dimension to increase the flow of a pressurized air therefrom to prescribed limits.

10. The combination set forth in claim 9, wherein said capillary tube retains a removable orifice plate adaptable to control the flow rate of air from prescribed sizes of delivery nozzles.

11. The combination set forth in claim 9, wherein a calibrated scale is mounted adjacent and contiguous with the arm of said constant hydrostatic head for reading the resistance of flow of said gas from said delivery nozzle.

12. The combination set forth in claim 9, including another gas line interconnecting with said pipette for passsage of pressurized purge air at higher pressure than said measuring air through said pipette during enlargement of said delivery nozzle, and switching means connected to said air lines for selective measurement and enlargement of said delivery nozzle.

13. Gauging apparatus for calibrating fluid delivery time from the tapered delivery nozzle of a tubular glass pipette with a standard comprising, in combination, at least two pressurized air lines interconnected at a junction, a length of flexible tubing connecting said junction and the opposite end of said pipette from its delivery nozzle, a flat disc abrasive wheel located near said pipette for grinding its nozzle portion perpendicular to its axis to a greater cross-sectional opening, one of said air lines having a capillary orifice adaptable to delivering air to said pipette at a controlled rate during measurement of resistance to flow, a constant hydrostatic head of liquid connected in parallel across said capillary orifice, and an arm of said hydrostatic head on the pipette side of said orifice adaptable to reading changes in line pressure due to retarded air flow from the delivery nozzle.

14. The combination set forth in claim 13, wherein the second air line is adaptable to supplying purging air at an increased rate during enlargement of said delivery nozzle.

15. The combination set forth in claim 13, including power actuated valves disposed intermediate the two pressurized air lines adjacent their junction for delivery of individual measuring and purging air streams to said pipette.

16. The method of calibrating the fluid delivery time of a tubular glass pipette having a tapered discharge end of small dimensions, said method comprising the steps of supplying pressurized air at constant pressure and at a controlled rate to pass through the interior of said pipette, allowing said pressurized air to emit freely from the unrestricted discharge end of said pipette, measuring the resistance to flow of said air from said discharge end during its free discharge by an interconnecting liquid column, enlarging the cross-sectional area of said discharge end by removing an exterior portion thereof to reduce the lengthwise dimension of said pipette, and alternately measuring resistance to flow of said pressurized air at intervals between repeated incremental removal of said exterior portion to secure a prescribed resistance of flow of said measuring air therethrough.

References Cited in the file of this patent

UNITED STATES PATENTS

| | | |
|---|---|---|
| 2,585,533 | Bryant et al. | Feb. 12, 1952 |
| 2,626,464 | Mennesson | Jan. 27, 1953 |
| 2,771,714 | Schmidt et al. | Nov. 27, 1956 |